US012730979B2

(12) United States Patent
Fons et al.

(10) Patent No.: US 12,730,979 B2
(45) Date of Patent: Sep. 8, 2026

(54) METHOD AND SYSTEM FOR TIME-SERIES ADAPTIVE DOMAIN-AWARE CAPTIONING

(71) Applicant: JPMorgan Chase Bank, N.A., New York, NY (US)

(72) Inventors: Elizabeth Fons, London (GB); Zhen Zeng, Ypsilanti, MI (US); Rachneet Kaur, Manhattan, NY (US); Tucker Richard Balch, Suwanee, GA (US); Svitlana Vyetrenko, Colts Neck, NJ (US); Manuela Veloso, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 304 days.

(21) Appl. No.: 18/375,759

(22) Filed: Oct. 2, 2023

(65) Prior Publication Data

US 2025/0111165 A1 Apr. 3, 2025

(51) Int. Cl.
*G06F 40/40* (2020.01)

(52) U.S. Cl.
CPC .................................. *G06F 40/40* (2020.01)

(58) Field of Classification Search
CPC ................................ G06F 40/40; G06F 40/56
USPC ............................................................ 704/9
See application file for complete search history.

(56) References Cited

U.S. PATENT DOCUMENTS 8,311,973 B1 * 11/2012 Zadeh ...................... G06T 7/12 706/903
11,887,215 B2 * 1/2024 Zhang ...................... G06T 5/50
12,300,007 B1 * 5/2025 Levner ................ G06V 10/761
2003/0200117 A1 * 10/2003 Manetta ................ G16H 15/00 715/733
2016/0055420 A1 * 2/2016 Karanam ............ A61B 5/7246 700/52
2018/0253627 A1 * 9/2018 Baradel ............ G06F 18/24133
2023/0376828 A1 * 11/2023 Zhao ................. G06Q 30/0641
2024/0135683 A1 * 4/2024 Li ......................... G06V 20/13

OTHER PUBLICATIONS

Elisa Celis, Fair and Diverse DPP-Based Data Summarization (Year: 2018).*

* cited by examiner

*Primary Examiner* — Fouzia Hye Solaiman
(74) *Attorney, Agent, or Firm* — Greenblum & Bernstein, P.L.C.

(57) ABSTRACT

A method and a system for generating domain-aware captions for time-series images that are capable of adapting to new domains without retraining are provided. The method includes: receiving information that relates to a first time-series image that is associated with a target domain; generating a generic caption for the first time-series image; extracting, from a memory based on the generic caption, a plurality of image-caption pairs; generating, for each respective one of the plurality of image-caption pairs, a corresponding domain-agnostic caption that includes information that describes a shape of the respective image; and adapting the generic caption into a domain-specific caption for the first time-series image that relates to the target domain. The generating of domain-agnostic captions and domain-specific captions may be performed by using models that are respectively trained based on synthetic time series images having captions that correspond to a set of parameters.

16 Claims, 5 Drawing Sheets

METHOD AND SYSTEM FOR TIME-SERIES ADAPTIVE DOMAIN-AWARE CAPTIONING

BACKGROUND

1. Field of the Disclosure

This technology generally relates to methods and systems for image captioning, and more particularly to methods and systems for generating domain-aware captions for time-series images that are capable of adapting to new domains without retraining.

2. Background Information

Image captioning has gained significant attention and advances in the fields of computer vision and natural language processing. The use of image captioning spans widely from aiding visually impaired individuals, and automating content discovery, to enhancing user experience in digital media. The majority of image captioning works focus on images of scenery or objects, leaving a vast area of potential unexplored, specifically in the captioning of time-series images.

Time-series plots are commonly used in many domains, such as finance, healthcare, climate science, and business analytics, to display trends and patterns in data over time. Despite their prevalence, automatic captioning of time series is under-explored compared to captioning of natural images. Recent advances have been made in time series captioning, some works focusing on captioning raw time-series data, and others exploring captioning time-series images. However, image-based time-series captioning may have a broader application range because it does not require access to the raw time-series data, such as when captioning time-series plots in reports.

Conventional methods for time-series captioning, regardless of whether raw time-series based or image-based, typically generate generic, domain-agnostic captions of time-series shapes. These captions lack the contextual relevance and domain specificity crucial for meaningful interpretation. For example, the corresponding captions may differ greatly when a trader in the finance domain observes the same time series versus a doctor in the healthcare domain. The same or similarly shaped time series have different implications and meanings in different domains.

Conventional methods that relate to image captioning for specific domains have typically required training or finetuning to adapt to specific domains, and thus have struggled to adapt to new domains without extensive retraining. This poses a significant limitation in their practical applicability.

Image captioning approaches currently in use involve the use of encoder-decoder methods. In these methods, an input image is passed through a visual encoder, and a caption is generated using an autoregressive language decoder. These large-scale general-purpose vision and language (V&L) models are pre-trained on a large number of image-text pairs to learn generic features, and then fine-tuned for a specific downstream task such as image captioning. Despite the impressive performance of these V&L models on natural images from different domains, adapting them for image captioning in new domains can be time-consuming and expensive, as it often requires a separate model to be fine-tuned or optimized for each new dataset. Further, as these models are scaled up, the computational requirements for pre-training and fine-tuning on downstream tasks also increase.

To overcome the issue of domain adaptation, retrieval-based image captioning has been studied, which involves conditioning the generation of captions on additional information retrieved from an external datastore. One approach entails the introduction of transformer-based captioning models that use retrieved captions as additional information for generating captions, and perform cross-attention over the encoded retrieved captions. Another approach entails a prompt-based conditioning approach, wherein retrieved captions are utilized as a prompt for a generative language model.

One approach to time series captioning is to use raw numerical time series data. However, in some cases, only plots of the time series data are available, such as in reports or presentations. This presents a challenge for downstream time series tasks, such as generating captions, as the raw data is not accessible. To address this challenge, some approaches have used images for time series forecasting and classifications tasks. In the context of time series captioning, there has been a specific focus on automatically generating captions for time series plots. However, all previous work in time series captioning, whether image-based or raw time series-based, generates captions that describe the generic shape of the time series. They do not take into account the domain-specific features of the time series; thus, captions from these models suffer from a lack of contextual relevance and domain specificity, which is essential for interpreting them meaningfully.

Accordingly, there is a need for a mechanism for generating domain-aware captions for time-series images that are capable of adapting to new domains without retraining.

SUMMARY

The present disclosure, through one or more of its various aspects, embodiments, and/or specific features or sub-components, provides, inter alia, various systems, servers, devices, methods, media, programs, and platforms for generating domain-aware captions for time-series images that are capable of adapting to new domains without retraining.

According to an aspect of the present disclosure, a method for generating captions for time-series images is provided. The method is implemented by at least one processor. The method includes: receiving, by the at least one processor, first information that relates to a first time-series image that is associated with a target domain; generating, by the at least one processor, a first generic caption for the first time-series image; extracting, by the at least one processor from a memory based on the first generic caption, a plurality of image-caption pairs; generating, by the at least one processor for each respective one of the plurality of image-caption pairs, a corresponding domain-agnostic caption that includes information that describes a shape of the respective image; and adapting, by the at least one processor, the first generic caption into a domain-specific caption for the first time-series image that relates to the target domain.

The method may further include: computing contrastive language—image pretraining (CLIP) image embeddings of a plurality of images stored in a target domain database; using a determinantal point process (DPP) to select a predetermined number of samples from the computed CLIP image embeddings; using a CLIP model as a visual encoder to encode the first time-series image; and using a decoder to perform the adapting.

The method may further include: generating at least one cross-attention layer between the visual encoder and the decoder based on the CLIP image embeddings; transmitting the CLIP image embeddings from the visual encoder to the decoder; and using the CLIP image embeddings for attention computation with respect to the adapting of the first generic caption into the domain-specific caption.

The generating of the corresponding domain-agnostic caption may include using a first model that is trained by using a first dataset that includes a first plurality of synthetic images associated with a first time series and a corresponding first plurality of captions that are generated by using a first predetermined set of parameters that correspond to the first time series.

The first predetermined set of parameters may include a mean value of the first time series, a mean-reversion parameter, a Gaussian random-noise parameter that is associated with a noise variance parameter, a trend parameter, a megashock probability parameter, and a megashock variance parameter.

Each respective one of the first plurality of captions may be generated by associating a descriptive non-domain-specific sentiment with each respective one of the first predetermined set of parameters.

The adapting may include using a second model that is trained by using a second dataset that includes a second plurality of synthetic images associated with a second time series and a corresponding second plurality of captions that are generated by using a second predetermined set of parameters that correspond to the second time series.

The second predetermined set of parameters may include a mean value of the second time series, a mean-reversion parameter, a Gaussian random-noise parameter that is associated with a noise variance parameter, a trend parameter, a megashock probability parameter, and a megashock variance parameter.

Each respective one of the second plurality of captions may be generated by associating a descriptive domain-specific sentiment with each respective one of the second predetermined set of parameters.

The target domain may include at least one from among a first domain that relates to finance, a second domain that relates to health care, a third domain that relates to climate science, a fourth domain that relates to business analytics, and a fifth domain that relates to kinematics.

According to another exemplary embodiment, a computing apparatus for generating captions for time-series images is provided. The computing apparatus includes a processor; a memory; and a communication interface coupled to each of the processor and the memory. The processor is configured to: receive, via the communication interface, first information that relates to a first time-series image that is associated with a target domain; generate a first generic caption for the first time-series image; extract, from the memory based on the first generic caption, a plurality of image-caption pairs; generate, for each respective one of the plurality of image-caption pairs, a corresponding domain-agnostic caption that includes information that describes a shape of the respective image; and adapt the first generic caption into a domain-specific caption for the first time-series image that relates to the target domain.

The processor may be further configured to: compute contrastive language—image pretraining (CLIP) image embeddings of a plurality of images stored in a target domain database; use a determinantal point process (DPP) to select a predetermined number of samples from the computed CLIP image embeddings; use a CLIP model as a visual encoder to encode the first time-series image; and use a decoder to perform the adapting.

The processor may be further configured to: generate at least one cross-attention layer between the visual encoder and the decoder based on the CLIP image embeddings; transmit the CLIP image embeddings from the encoder to the decoder; and use the CLIP image embeddings for attention computation with respect to the adapting of the first generic caption into the domain-specific caption.

The processor may be further configured to perform the generation of the corresponding domain-agnostic caption by using a first model that is trained by using a first dataset that includes a first plurality of synthetic images associated with a first time series and a corresponding first plurality of captions that are generated by using a first predetermined set of parameters that correspond to the first time series.

The first predetermined set of parameters may include a mean value of the first time series, a mean-reversion parameter, a Gaussian random-noise parameter that is associated with a noise variance parameter, a trend parameter, a megashock probability parameter, and a megashock variance parameter.

The processor may be further configured to use the first model to generate each respective one of the first plurality of captions by associating a descriptive non-domain-specific sentiment with each respective one of the first predetermined set of parameters.

The processor may be further configured to perform the adapting by using a second model that is trained by using a second dataset that includes a second plurality of synthetic images associated with a second time series and a corresponding second plurality of captions that are generated by using a second predetermined set of parameters that correspond to the second time series.

The second predetermined set of parameters may include a mean value of the second time series, a mean-reversion parameter, a Gaussian random-noise parameter that is associated with a noise variance parameter, a trend parameter, a megashock probability parameter, and a megashock variance parameter.

The processor may be further configured to use the second model to generate each respective one of the second plurality of captions by associating a descriptive domain-specific sentiment with each respective one of the second predetermined set of parameters.

According to yet another exemplary embodiment, a non-transitory computer readable storage medium storing instructions for generating captions for time-series images is provided. The storage medium includes executable code which, when executed by a processor, causes the processor to: receive first information that relates to a first time-series image that is associated with a target domain; generate a first generic caption for the first time-series image; extract, from a memory based on the first generic caption, a plurality of image-caption pairs; generate, for each respective one of the plurality of image-caption pairs, a corresponding domain-agnostic caption that includes information that describes a shape of the respective image; and adapt the first generic caption into a domain-specific caption for the first time-series image that relates to the target domain.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
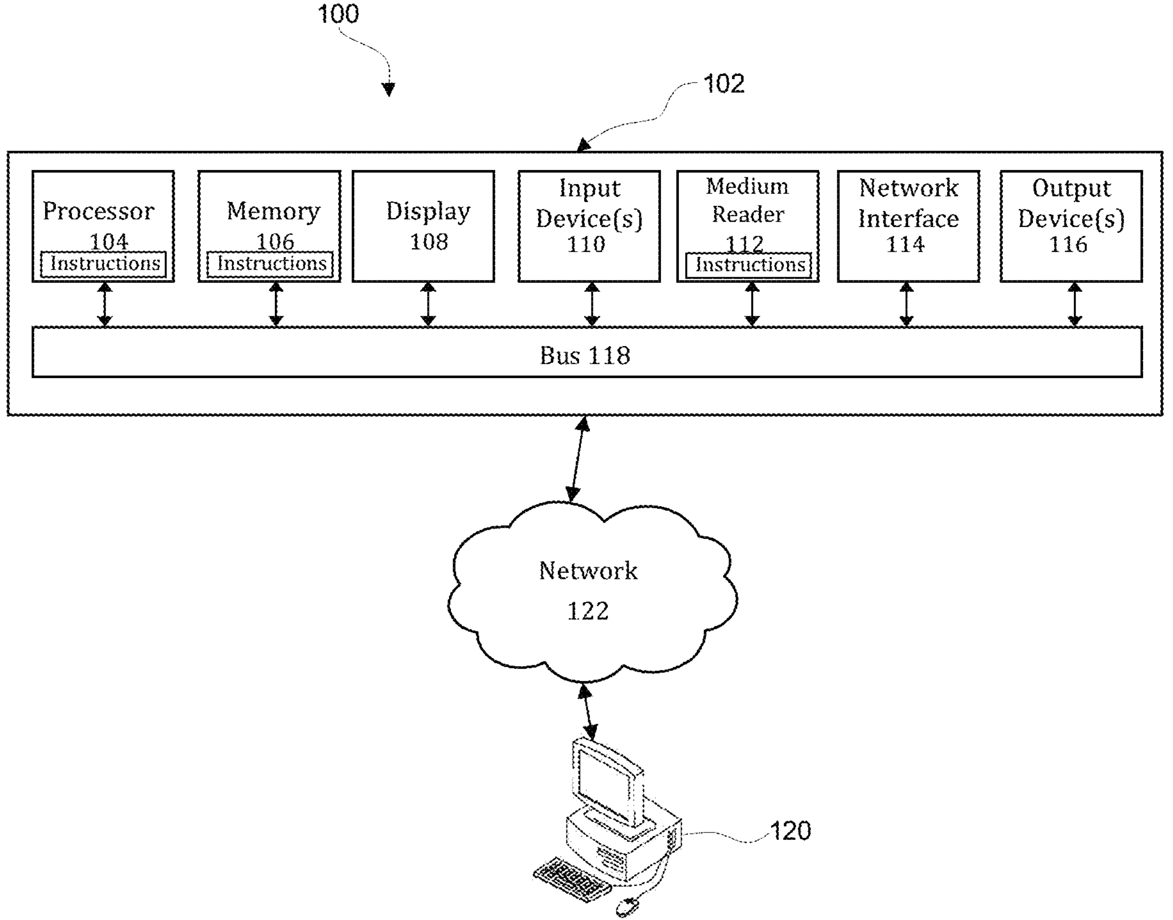
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for generating domain-aware captions for time-series images that are capable of adapting to new domains without retraining.

Figure 2:
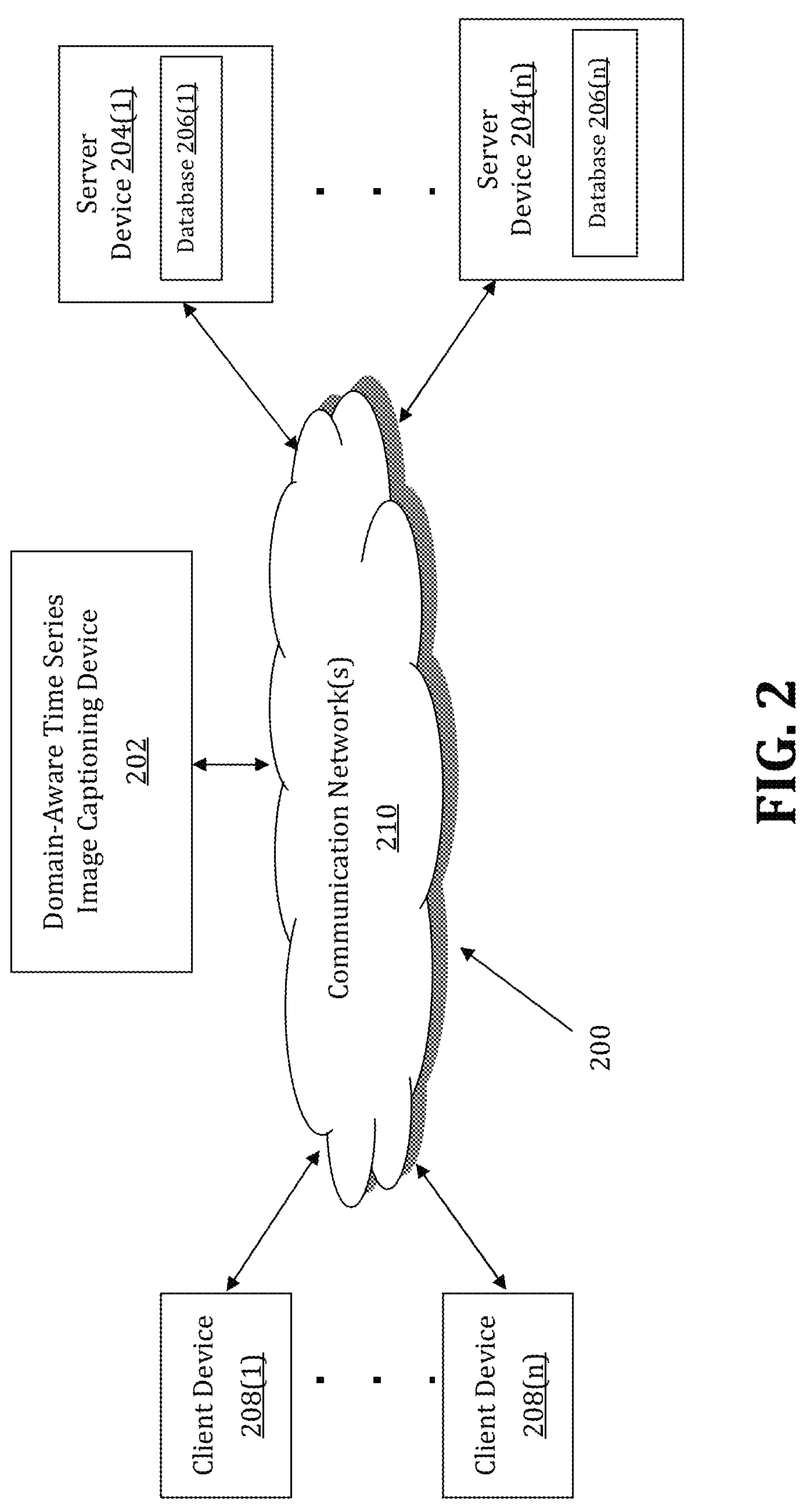
FIG. 2 illustrates an exemplary diagram of a network environment.

Referring to FIG. 2, a schematic of an exemplary network environment 200 for implementing a method for generating domain-aware captions for time-series images that are capable of adapting to new domains without retraining is illustrated. In an exemplary embodiment, the method is executable on any networked computer platform, such as, for example, a personal computer (PC).

The method for generating domain-aware captions for time-series images that are capable of adapting to new domains without retraining may be implemented by a Domain-Aware Time Series Image Captioning (DATSIC) device 202. The DATSIC device 202 may be the same or similar to the computer system 102 as described with respect to FIG. 1. The DATSIC device 202 may store one or more applications that can include executable instructions that, when executed by the DATSIC device 202, cause the DATSIC device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DATSIC device 202 itself, may be located in virtual server(s) running in a cloud-based computing environment rather than being tied to one or more specific physical network computing devices. Also, the application(s) may be running in one or more virtual machines (VMs) executing on the DATSIC device 202. Additionally, in one or more embodiments of this technology, virtual machine(s) running on the DATSIC device 202 may be managed or supervised by a hypervisor.

In the network environment 200 of FIG. 2, the DATSIC device 202 is coupled to a plurality of server devices 204(1)-204(*n*) that hosts a plurality of databases 206(1)-206 (*n*), and also to a plurality of client devices 208(1)-208(*n*) via communication network(s) 210. A communication interface of the DATSIC device 202, such as the network interface 114 of the computer system 102 of FIG. 1, operatively couples and communicates between the DATSIC device 202, the server devices 204(1)-204(*n*), and/or the client devices 208(1)-208(*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DATSIC device 202, the server devices 204(1)-204(*n*), and/or the client devices 208(1)-208(*n*) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DATSIC devices that efficiently implement a method for generating domain-aware captions for time-series images that are capable of adapting to new domains without retraining.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DATSIC device 202 may be a standalone device or integrated with one or more other devices or apparatuses, such as one or more of the server devices 204(1)-204(*n*), for example. In one particular example, the DATSIC device 202 may include or be hosted by one of the server devices 204(1)-204(*n*), and other arrangements are also possible. Moreover, one or more of the devices of the DATSIC device 202 may be in a same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204 (*n*) may include, among other features, one or more processors, a memory, and a communication interface, which are coupled together by a bus or other communication link, although other numbers and/or types of network devices may be used. The server devices 204(1)-204(*n*) in this example may process requests received from the DATSIC device 202 via the communication network(s) 210 according to the HTTP-based and/or JavaScript Object Notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) hosts the databases 206(1)-206 (*n*) that are configured to store historical time series image data and data that relates to domain-specific time series captions.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204 (1)-204(*n*) may contain a plurality of network computing devices that operate using a master/slave approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. For example, the client devices 208 (1)-208(*n*) in this example may include any type of computing device that can interact with the DATSIC device 202 via communication network(s) 210. Accordingly, the client devices 208(1)-208(*n*) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(*n*) may run interface applications, such as standard web browsers or standalone client applications, which may provide an interface to communicate with the DATSIC device 202 via the communication network(s) 210 in order to communicate user requests and information. The client devices 208(1)-208(*n*) may further include, among other features, a display device, such as a display screen or touchscreen, and/or an input device, such as a keyboard, for example.

Although the exemplary network environment 200 with the DATSIC device 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DATSIC device 202, the server devices 204(1)-204(*n*), or the client devices 208(1)-

208(*n*), for example, may be configured to operate as virtual instances on the same physical machine. In other words, one or more of the DATSIC device 202, the server devices 204(1)-204(*n*), or the client devices 208(1)-208(*n*) may operate on the same physical device rather than as separate devices communicating through communication network(s) 210. Additionally, there may be more or fewer DATSIC devices 202, server devices 204(1)-204(*n*), or client devices 208(1)-208(*n*) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the internet, intranets, and combinations thereof.

Figure 3:
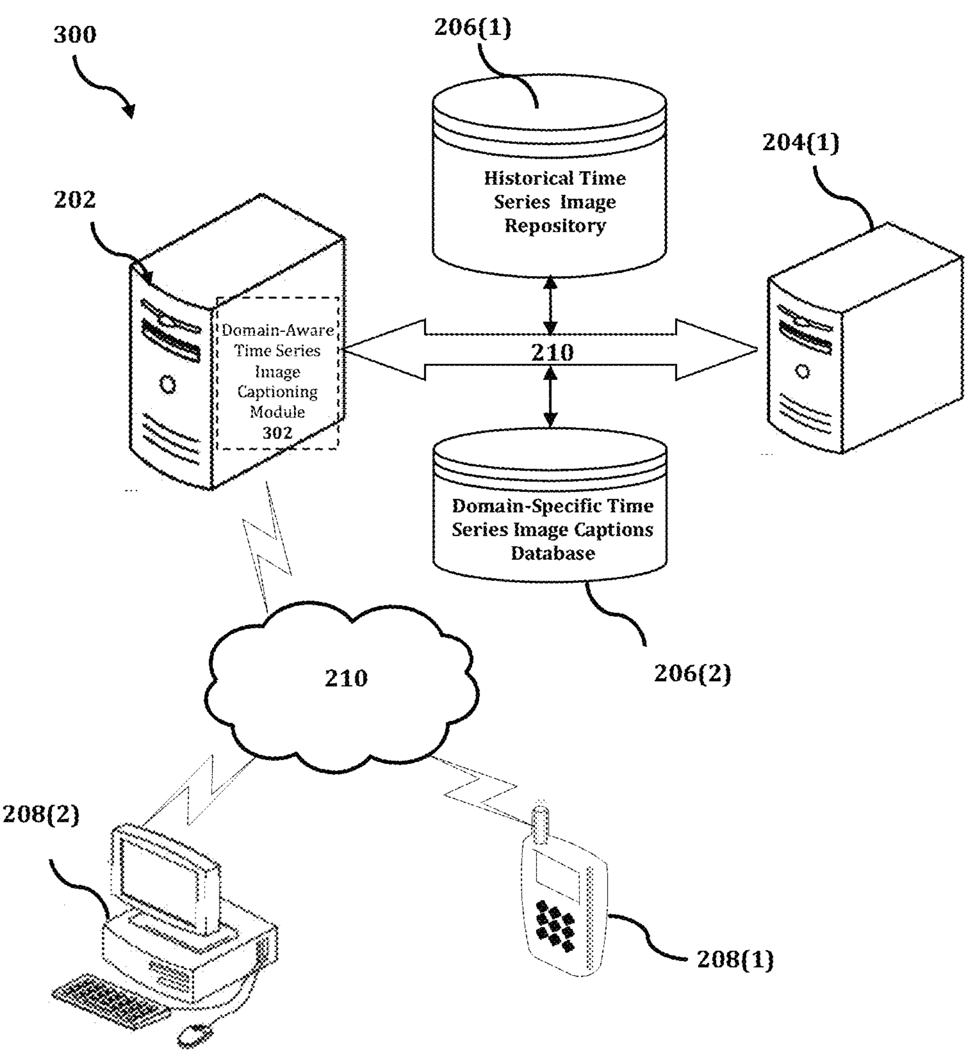
FIG. 3 shows an exemplary system for implementing a method for generating domain-aware captions for time-series images that are capable of adapting to new domains without retraining.

The DATSIC device 202 is described and illustrated in FIG. 3 as including a domain-aware time series image captioning module 302, although it may include other rules, policies, modules, databases, or applications, for example. As will be described below, the domain-aware time series image captioning module 302 is configured to implement a method for generating domain-aware captions for time-series images that are capable of adapting to new domains without retraining.

An exemplary process 300 for implementing a mechanism for generating domain-aware captions for time-series images that are capable of adapting to new domains without retraining by utilizing the network environment of FIG. 2 is illustrated as being executed in FIG. 3. Specifically, a first client device 208(1) and a second client device 208(2) are illustrated as being in communication with DATSIC device 202. In this regard, the first client device 208(1) and the second client device 208(2) may be "clients" of the DATSIC device 202 and are described herein as such. Nevertheless, it is to be known and understood that the first client device 208(1) and/or the second client device 208(2) need not necessarily be "clients" of the DATSIC device 202, or any entity described in association therewith herein. Any additional or alternative relationship may exist between either or both of the first client device 208(1) and the second client device 208(2) and the DATSIC device 202, or no relationship may exist.

Further, DATSIC device 202 is illustrated as being able to access a historical time series image repository 206(1) and a domain-specific time series image captions database 206(2). The domain-aware time series image captioning module 302 may be configured to access these databases for implementing a method for generating domain-aware captions for time-series images that are capable of adapting to new domains without retraining.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DATSIC device 202 via broadband or cellular communication. Of course, these embodiments are merely exemplary and are not limiting or exhaustive.

Upon being started, the domain-aware time series image captioning module 302 executes a process for generating domain-aware captions for time-series images that are capable of adapting to new domains without retraining. An exemplary process for generating domain-aware captions for time-series images that are capable of adapting to new domains without retraining is generally indicated at flowchart 400 in FIG. 4.

Figure 4:
FIG. 4 is a flowchart of an exemplary process for implementing a method for generating domain-aware captions for time-series images that are capable of adapting to new domains without retraining.
Figure 4:
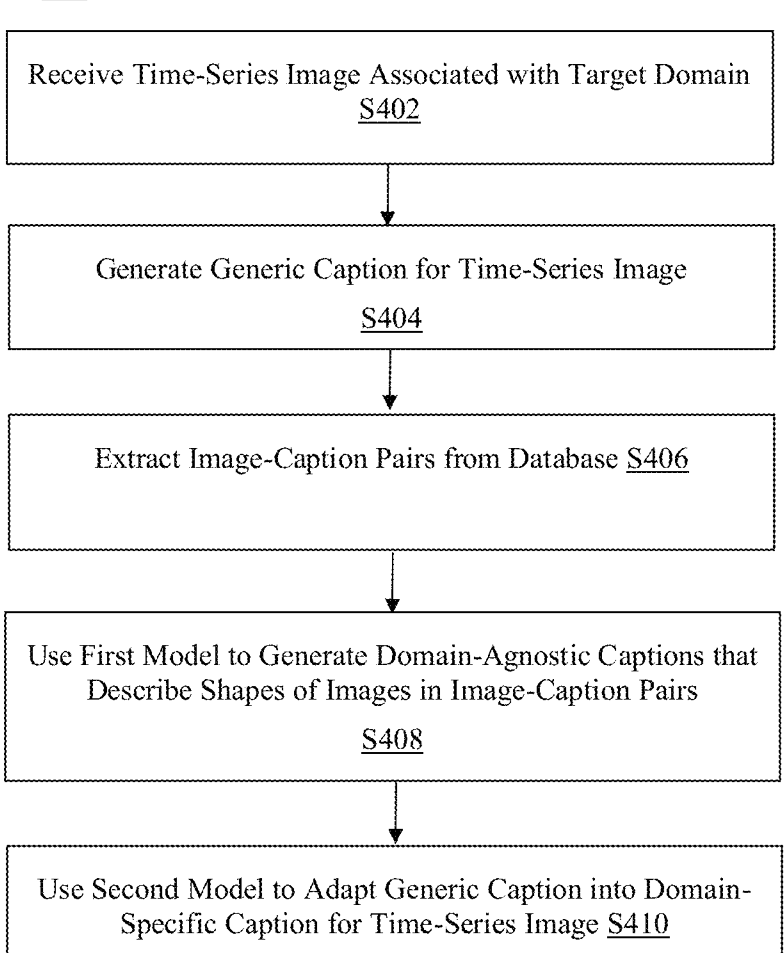

In process 400 of FIG. 4, at step S402, the domain-aware time series image captioning module 302 receives first information that relates to a first time-series image that is associated with a target domain. In an exemplary embodiment, the target domain may include any one or more of a first domain that relates to finance, e.g., stock prices over a particular time interval; a second domain that relates to health care, e.g., number of COVID infections over a particular time interval; a third domain that relates to climate science; a fourth domain that relates to business analytics; and/or a fifth domain that relates to kinematics.

At step S404, the domain-aware time series image captioning module 302 generates a generic caption for the first time-series image. In an exemplary embodiment, the genericness of the caption is manifested by the fact that the caption does not include any information that would tend to indicate a particular domain to which the first time-series belongs.

At step S406, the domain-aware time series image captioning module 302 uses the generic caption for the first time-series image as a basis for extracting a set of image-caption pairs from a memory, i.e., a database. In an exemplary embodiment, the captions in each image-caption pair may include domain-specific information, but the images are selected based on a relative similarity to the first time-series image.

At step S408, the domain-aware time series image captioning module 302 uses a first model to generate, for each respective image included in the set of image-caption pairs extracted in step S406, a corresponding domain-agnostic caption that includes information that describes a shape of the respective image. In an exemplary embodiment, the first model is trained by using a first dataset that includes a first plurality of synthetic images associated with a first time series and a corresponding first plurality of captions that are generated by using a first predetermined set of parameters that correspond to the first time series.

In an exemplary embodiment, the first predetermined set of parameters may include any one or more of a mean value of the first time series, a mean-reversion parameter, a Gaussian random-noise parameter that is associated with a noise variance parameter, a trend parameter, a megashock probability parameter, and a megashock variance parameter. The first plurality of captions may be generated by associating a descriptive non-domain-specific sentiment with each respective parameter.

At step S410, the domain-aware time series image captioning module 302 uses a second model to adapt and/or translate the generic caption that was generated for the first time-series image in step S404 into a domain-specific caption for the first time-series image that relates to the target domain. In an exemplary embodiment, the second model is trained by using a second dataset that includes a second plurality of synthetic images associated with a second time series and a corresponding second plurality of captions that are generated by using a second predetermined set of parameters that correspond to the second time series.

In an exemplary embodiment, the second predetermined set of parameters may also include any one or more of a mean value of the second time series, a mean-reversion parameter, a Gaussian random-noise parameter that is associated with a noise variance parameter, a trend parameter, a megashock probability parameter, and a megashock variance parameter. The second plurality of captions may be generated by associating a descriptive domain-specific sentiment with each respective parameter.

In an exemplary embodiment, the domain-aware time series image captioning module 302 may also make use of a cross-attention layer that is provided after the domain-agnostic captions are generated and in advance of the translation of the first generic caption into the domain-specific caption for the first time-series image. In this aspect, the domain-aware time series image captioning module 302 may be further configured to perform the following operations: computing contrastive language-image pretraining (CLIP) image embeddings of a plurality of images that are stored in a database that relates to the target domain; using a determinantal point process (DPP) to select a predetermined number of samples from the computed CLIP image embeddings; using a CLIP model as a visual encoder to encode the first time-series image; and using a decoder, such as, for example, a generative pre-trained transformer 2 (GPT-2) model, to perform the adapting. The cross-attention layer as between the visual encoder and the decoder may be generated based on the CLIP image embeddings. The CLIP image embeddings may be transmitted from the encoder to the decoder, thereby enabling the decode to use the CLIP image embedding for attention computation with respect to the adapting operation of step S410.

Figure 5:
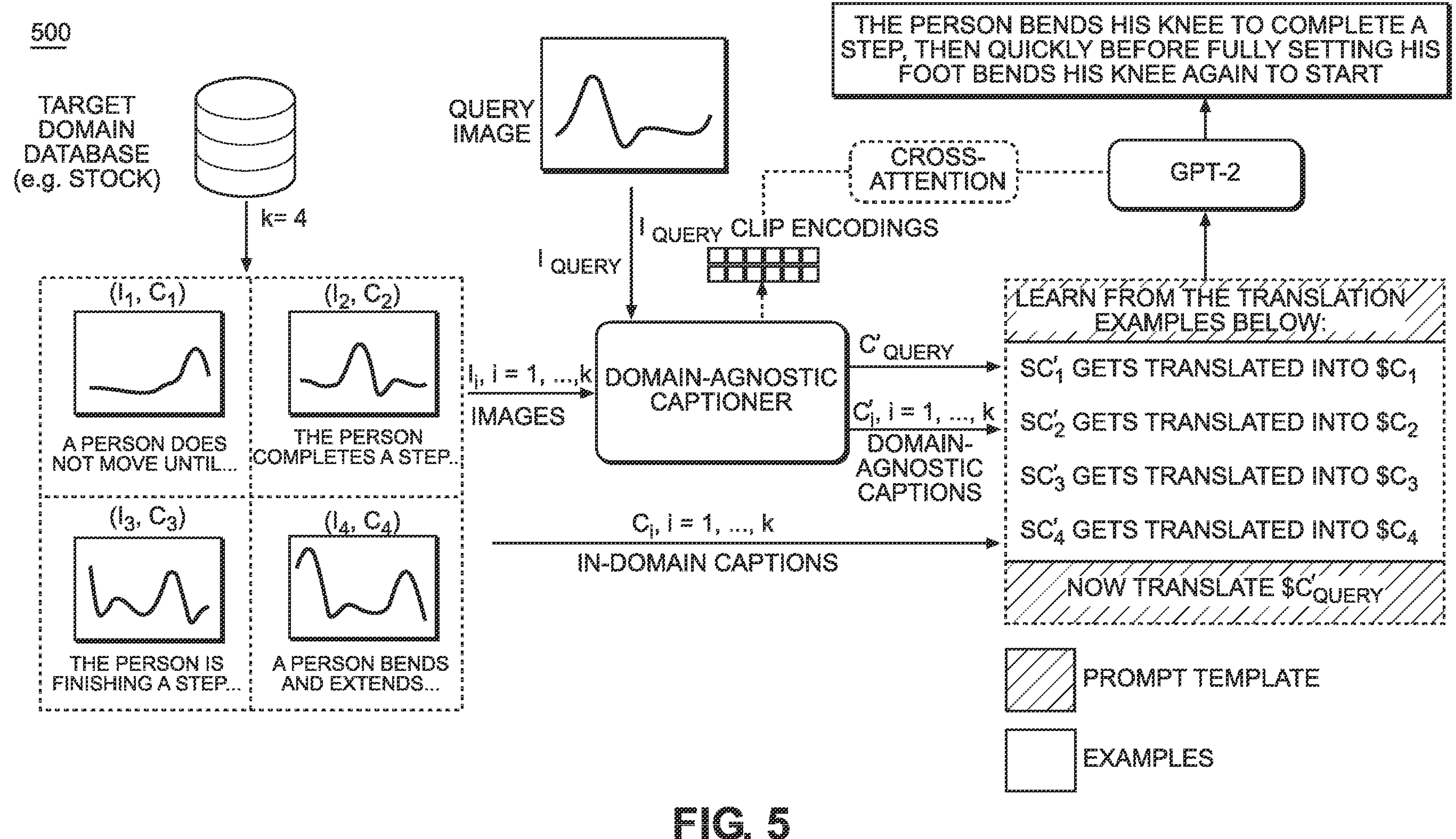
FIG. 5 is a diagram that illustrates an overview of a system that implements a method for generating domain-aware captions for time-series images that are capable of adapting to new domains without retraining, according to an exemplary embodiment.

In an exemplary embodiment, a system referred to herein as Time-series Adaptive Domain-Aware Captioning (TADACap) is provided to tackle the problem of domain-aware captioning of time series. FIG. 5 is a diagram 500 that illustrates an overview of a TADACap system that implements a method for generating domain-aware captions for time-series images that are capable of adapting to new domains without retraining, according to an exemplary embodiment.

As illustrated in FIG. 5, advantageous use may be made of a Domain-Agnostic Captioner that can generate a generic shape description of a given time series image. In an exemplary embodiment, this domain-agnostic captioner may employ any CLIP-based image captioning method, and is pre-trained on time series datasets with domain-agnostic captions.

Given a query image $I_{query}$ of a time series, TADACap first uses a Domain-Agnostic Captioner to generate a generic caption $C_{query}$. From the target domain database, TADACap extracts a diverse set of k image-caption pairs $\langle I_i, C_i \rangle$ as further described below. Then TADACap generates a domain-agnostic caption $$C_i'$$

corresponding to each of those k images, thus composing a list of in-domain and domain-agnostic caption pairs $$\langle C_i, C_i' \rangle.$$

Finally, TADACap adapts $C_{query}$ to the target domain through GPT prompts containing $$\langle C_i, C_i' \rangle.$$

Optionally, it is also possible to add and learn cross-attention layers between CLIP image encodings of $I_{query}$ and the GPT-2 model.

Diverse k Samples: Given a target domain database, in an exemplary embodiment, there is an objective to select k diverse samples from the database. Passing all entries in the target domain database to the rest of the pipeline is inefficient, and thus, the number of samples is limited to k. Using a diverse set of samples provides good coverage of the target domain knowledge.

Annotating captions of images can be expensive, especially for time series that require domain knowledge such as sensor readings (e.g., Electrocardiogram (ECG) signals or satellite readings). One advantage of this method is largely reduced annotation efforts on image captioning for users to prepare the target domain database. Users can effectively construct a target domain database as follows: 1) First, collect a set of time series images from the target domain without captions; 2) use this method to select k diverse samples from the database; 3) annotate the captions only for the selected k images rather than all images in the database.

To achieve this, the first step of the method is to compute the CLIP image embeddings of the images in the target domain database; then, the second step is to use a Determinantal Point Process (DPP) to select a diverse subset of k samples from the set of embeddings. DPPs are probabilistic models that capture diversity by assigning a higher probability to subsets of points that are well spread out. DPPs have proven to be effective in discovering a diverse subset of samples given a collection of high-dimensional points.

Formally, the CLIP image embeddings of given set of images may be extracted as $X=\{x_1, x_2, \ldots, x_N\}$, and a definition may be provided for a kernel matrix $L \in R^{N \times N}$, where $L(i,j)=\mathrm{sim}(x_i,x_j)$ computes the cosine similarity between embedding $x_i$ and $x_j$. A DPP measures the probability of selecting a subset S from X as $$P(S)=\det(L(S))/\det(L+I) \quad \text{(Expression 1)}$$

where det(·) computes the determinant of an input matrix, and I is the N×N identity matrix, where Nis the number of images in the database. To obtain the subset of size k with the maximum diversity, a solution is determined for a maximum a posteriori (MAP) problem, $$S^* = \underset{S,|S|=k}{\operatorname{argmax}} \det(L(S))/\det(L+I) \quad \text{(Expression 2)}$$

which can be solved through an efficient greedy algorithm with complexity $O(Nk^2)$. It is not guaranteed to find the global maximum of the DPP distribution. However, in practice, it often produces high-quality subsets that are diverse and representative of the original set.

Cross-Attention: In an exemplary embodiment, advantageous use is made of a CLIP model as a visual encoder to encode the query image, and optionally cross-attention layers are established between the CLIP encoder and the GPT-2 decoder. Specifically, CLIP encoder outputs the key and value embeddings, which are input to the GPT-2 decoder for attention computation on query embeddings. With the selected diverse k images, their annotated in-domain captions are taken, and a calculation is made of the corresponding agnostic caption. This is then used to construct the instruction prompt X following a template: Learn from the following translation examples: {agnostic caption1} gets translated into {in-domain caption1} . . . . Then {query agnostic caption1} is translated into {query in-domain caption 1}.

When adding the cross-attention layers, the weights (θ) are trained by minimizing the cross-entropy loss of predicting the N tokens in the reference caption, conditioned on the features provided by the CLIP encoder V and the instruction prompt X:

$$L_\theta = -\sum_{I=1}^{N} \log P_\theta(y_i \mid y_{<I}, X, V, \theta) \quad \text{(Expression 3)}$$

Implementation: In an exemplary embodiment, TADACap is compatible with any CLIP-based Domain-Agnostic Captioner. For example, advantageous use may be made of a vision-encoder language-decoder architecture with cross-attention layers, which is a typical design shared across the image captioning community. As the encoder, for example, CLIP-ViT-B/32 may be used, and for the decoder, for example, GPT-2 may be used. Both encoder and decoder are fixed. In an exemplary embodiment, the model may be trained to minimize the cross-entropy loss using an AdamW optimizer with an initial learning rate of 1e-4 and a batch size of 16.

Datasets—Domain-Agnostic Time Series Captions: In an exemplary embodiment, a domain-agnostic time series caption dataset may be synthesized for pre-training the Domain-Agnostic Captioner. Once the Domain-Agnostic Captioner is trained, it may be used as a black box in TADACap.

In an exemplary embodiment, a time series caption data-set referred to herein as SynthTS (5 k image-caption pairs, with (4 k,500,500) train/validation/test split) has been synthesized by generating time series with different trends and standard deviation, and captions are automatically generated for each time series based on the rules. To generate this dataset, advantageous use has been made of the discrete mean-reverting time series which is frequently used to model financial markets as well as biological processes and is described by the equations below:

$$r_t = \max\{0, \kappa\bar{r} + (1-\kappa)r_{t-1} + u_t\}, \; r_0 = \bar{r},$$

where $\bar{r}$ is a mean value of the time series, K is a mean-reversion parameter and $u_t \sim N(0, \sigma^2)$ is random noise added to the time series at each time step t. Further, there is also an inclusion of directionality and a possibility of a large shock occurrence to the above generating process by introducing the concepts of trend and megashocks. Trend T is added to rt at each time step t to indicate the incline or decline of the stock value. Megashocks are intended to represent the exogenous events that occur infrequently and can have significant impact on the generating process. Mathematically, megashocks can arrive at any time t with probability of occurrence p, and are drawn from $N(0, \sigma_{shock}^2)$ where $\sigma_{shock} >> \sigma$.

To auto-generate the caption for the generated time series, the numerical value of each parameter $\bar{r}$, κ, σ, T, p, $\sigma_{shock}$ is associated with a sentiment that describes it. For instance, near-zero values of trend T can be described as "neutral, horizontal, non-increasing, flat, stable, unchanged"; larger positive values of T can be described as "upward, growing, positive, increasing, rising, climbing, advancing"; and smaller negative values of T can be described as "declining, falling, sliding, sinking, plummeting, downward".

It is noted that the model disclosed herein and all of the sentiment captions are non-specific to a particular application and can be used to describe a generic time series agnostic of the domain. Domain-agnostic captions focus on describing the generic shape of the time series without jargon from any specific domains.

Datasets—Domain-Specific Time Series Captions: In an exemplary embodiment, three synthetic datasets have been created for training and testing TADACap. For training TADACap, the strategy discussed above has been followed in order to synthesize a domain-specific time series caption dataset referred to herein as SynthStock ((4 k,500,500) train/validation/test split) in the domain of financial stock price series. The time series has been synthesized by using the same parameters as those discussed above, and a different rule has been used to generate the domain-specific captions. In particular, for a trend T that is near-zero, it can be described as "the price of the stock remains unchanged", or for high values of σ, it may be described that "the stock experiences high volatility".

For testing TADACap, advantageous use may be made of public captionless real-world time series datasets, such as, for example, one in the clinical domain recording the number of Covid positive cases over time, referred to herein as "RealCovid", containing 154 annotated image-caption pairs; and another in the kinematics domain recording the knee angle during human locomotion, referred to herein as "RealKnee", containing 112 image-caption pairs. User surveys have been created to collect captions for time series in both datasets, composing the real-world time series caption datasets RealCovid and RealKnee. Unlike domain-agnostic captions, these captions are annotated given particular domain contexts. Examples of domain-specific captions for each domain have been provided as guidance, and annotators have been asked to properly describe a displayed time series image accordingly.

Training and validation of TADACap has been performed only on the SynthStock dataset, and testing on RealCovid and RealKnee datasets has been performed in order to demonstrate the ability of TADACap to adapt and generate domain-aware captions for new domains. During both training and testing, the query image is sampled and removed from the domain database, excluding the selected diverse k samples.

Ablation Study—Diverse k Samples Selection: In an ablation study, an investigation of the impact of diverse sample selection from the target domain database has been performed. In particular, a retrieval strategy has been replaced with a random approach, wherein a random sample of k images from the target domain image dataset is drawn and users are asked for caption annotations for those k images. However, it has been found that the random approach underperforms TADACap on major metrics of image captioning, especially on the RealKnee dataset. This result indicates the importance of utilizing diverse samples in subsequent GPT prompts.

Cross-Attention: In another set of ablation experiments, an assessment has been made of the role of optional cross-attention layers in the model. In general, cross-attention layers help integrate visual information into the captioning process. To perform the assessment, the cross-attention layers were added and an observation of the impact on the generated captions was made. However, the result of the assessment has shown that the addition of cross-attention impairs GPT's ability to produce meaningful captions. A close inspection reveals cross-attention layers are biased towards the SynthStock dataset on which the model is trained.

Accordingly, with this technology, a process for generating domain-aware captions for time-series images that are capable of adapting to new domains without retraining is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for generating captions for time-series images, the method being implemented by at least one processor, the method comprising:

receiving, by the at least one processor, first information that relates to a first time-series image that is associated with a target domain;

generating, by the at least one processor, a first generic caption for the first time-series image;

extracting, by the at least one processor from a memory based on the first generic caption, a plurality of image-caption pairs;

generating, by the at least one processor for each respective one of the plurality of image-caption pairs, a corresponding domain-agnostic caption that includes information that describes a shape of the respective image; and adapting, by the at least one processor, the first generic caption into a domain-specific caption for the first time-series image that relates to the target domain;

computing contrastive language-image pretraining (CLIP) image embeddings of a plurality of images stored in a target domain database;

using a determinantal point process (DPP) to select a predetermined number of samples from the computed CLIP image embeddings;

using a CLIP model as a visual encoder to encode the first time-series image;

using a decoder to perform the adapting;

generating at least one cross-attention layer between the visual encoder and the decoder based on the CLIP image embeddings;

transmitting the CLIP image embeddings from the visual encoder to the decoder; and using the CLIP image embeddings for attention computation with respect to the adapting of the first generic caption into the domain-specific caption.

2. The method of claim 1, wherein the generating of the corresponding domain-agnostic caption comprises using a first model that is trained by using a first dataset that includes a first plurality of synthetic images associated with a first time series and a corresponding first plurality of captions that are generated by using a first predetermined set of parameters that correspond to the first time series.

3. The method of claim 2, wherein the first predetermined set of parameters includes a mean value of the first time series, a mean-reversion parameter, a Gaussian random-noise parameter that is associated with a noise variance parameter, a trend parameter, a megashock probability parameter, and a megashock variance parameter.

4. The method of claim 3, wherein each respective one of the first plurality of captions is generated by associating a descriptive non-domain-specific sentiment with each respective one of the first predetermined set of parameters.

5. The method of claim 1, wherein the adapting comprises using a second model that is trained by using a second dataset that includes a second plurality of synthetic images associated with a second time series and a corresponding second plurality of captions that are generated by using a second predetermined set of parameters that correspond to the second time series.

6. The method of claim 5, wherein the second predetermined set of parameters includes a mean value of the second time series, a mean-reversion parameter, a Gaussian random-noise parameter that is associated with a noise variance parameter, a trend parameter, a megashock probability parameter, and a megashock variance parameter.

7. The method of claim 6, wherein each respective one of the second plurality of captions is generated by associating a descriptive domain-specific sentiment with each respective one of the second predetermined set of parameters.

8. The method of claim 1, wherein the target domain includes at least one from among a first domain that relates to finance, a second domain that relates to health care, a third domain that relates to climate science, a fourth domain that relates to business analytics, and a fifth domain that relates to kinematics.

9. A computing apparatus for generating captions for time-series images, the computing apparatus comprising:

a processor;

a memory; and a communication interface coupled to each of the processor and the memory, wherein the processor is configured to:

receive, via the communication interface, first information that relates to a first time-series image that is associated with a target domain;

generate a first generic caption for the first time-series image;

extract, from the memory based on the first generic caption, a plurality of image-caption pairs;

generate, for each respective one of the plurality of image-caption pairs, a corresponding domain-agnostic caption that includes information that describes a shape of the respective image; adapt the first generic caption into a domain-specific caption for the first time-series image that relates to the target domain;

compute contrastive language-image pretraining (CLIP) image embeddings of a plurality of images stored in a target domain database;

use a determinantal point process (DPP) to select a predetermined number of samples from the computed CLIP image embeddings;

use a CLIP model as a visual encoder to encode the first time-series image;

use a decoder to perform adaption of the first generic caption into the domain-specific caption;

generate at least one cross-attention layer between the visual encoder and the decoder based on the CLIP image embeddings;

transmit the CLIP image embeddings from the visual encoder to the decoder; and use the CLIP image embeddings for attention computation with respect to the adaption of the first generic caption into the domain-specific caption.

10. The computing apparatus of claim 9, wherein the processor is further configured to perform generation of the corresponding domain-agnostic caption by using a first model that is trained by using a first dataset that includes a first plurality of synthetic images associated with a first time series and a corresponding first plurality of captions that are generated by using a first predetermined set of parameters that correspond to the first time series.

11. The computing apparatus of claim 10, wherein the first predetermined set of parameters includes a mean value of the first time series, a mean-reversion parameter, a Gaussian random-noise parameter that is associated with a noise variance parameter, a trend parameter, a megashock probability parameter, and a megashock variance parameter.

12. The computing apparatus of claim 11, wherein the processor is further configured to use the first model to generate each respective one of the first plurality of captions by associating a descriptive non-domain-specific sentiment with each respective one of the first predetermined set of parameters.

13. The computing apparatus of claim 9, wherein the processor is further configured to perform the adaption by using a second model that is trained by using a second dataset that includes a second plurality of synthetic images associated with a second time series and a corresponding second plurality of captions that are generated by using a second predetermined set of parameters that correspond to the second time series.

14. The computing apparatus of claim 13, wherein the second predetermined set of parameters includes a mean value of the second time series, a mean-reversion parameter, a Gaussian random-noise parameter that is associated with a noise variance parameter, a trend parameter, a megashock probability parameter, and a megashock variance parameter.

15. The computing apparatus of claim 14, wherein the processor is further configured to use the second model to generate each respective one of the second plurality of captions by associating a descriptive domain-specific sentiment with each respective one of the second predetermined set of parameters.

16. A non-transitory computer readable storage medium storing instructions for generating captions for time-series images, the storage medium comprising executable code which, when executed by a processor, causes the processor to:

receive first information that relates to a first time-series image that is associated with a target domain;

generate a first generic caption for the first time-series image;

extract, from a memory based on the first generic caption, a plurality of image-caption pairs;

generate, for each respective one of the plurality of image-caption pairs, a corresponding domain-agnostic caption that includes information that describes a shape of the respective image;

adapt the first generic caption into a domain-specific caption for the first time-series image that relates to the target domain;

compute contrastive language-image pretraining (CLIP) image embeddings of a plurality of images stored in a target domain database;

use a determinantal point process (DPP) to select a predetermined number of samples from the computed CLIP image embeddings;

use a CLIP model as a visual encoder to encode the first time-series image;

use a decoder to perform adaption of the first generic caption into the domain-specific caption;

generate at least one cross-attention layer between the visual encoder and the decoder based on the CLIP image embeddings;

transmit the CLIP image embeddings from the visual encoder to the decoder; and use the CLIP image embeddings for attention computation with respect to the adaption of the first generic caption into the domain-specific caption.

* * * * *